(12) United States Patent
Anderson

(10) Patent No.: US 10,555,518 B2
(45) Date of Patent: Feb. 11, 2020

(54) DECOY TETHERING DEVICE

(71) Applicant: William Anderson, Galena, KS (US)

(72) Inventor: William Anderson, Galena, KS (US)

( * ) Notice: Subject to any disclaimer, the term of this patent is extended or adjusted under 35 U.S.C. 154(b) by 196 days.

(21) Appl. No.: 15/704,604

(22) Filed: Sep. 14, 2017

(65) Prior Publication Data

US 2019/0075784 A1 Mar. 14, 2019

(51) Int. Cl.
*A01M 31/06* (2006.01)
*B63B 21/24* (2006.01)

(52) U.S. Cl.
CPC ............. *A01M 31/06* (2013.01); *B63B 21/24* (2013.01)

(58) Field of Classification Search
CPC .................................................... A01M 31/06
USPC ............................................................ 43/2, 3
See application file for complete search history.

(56) References Cited

U.S. PATENT DOCUMENTS

| | | | | |
|---|---|---|---|---|
| 1,617,153 A | * | 2/1927 | Gibbs | A01M 31/06 119/714 |
| 1,697,561 A | * | 1/1929 | Freeman | A01M 31/06 24/502 |
| 1,879,991 A | * | 9/1932 | Pratt | A01M 31/06 119/714 |
| 2,678,778 A | * | 5/1954 | Gibson | A01M 31/06 242/125.2 |
| 2,747,814 A | * | 5/1956 | Taylor | A01M 31/06 242/379.2 |
| 4,757,630 A | * | 7/1988 | Torberg | A01M 31/06 43/3 |
| 4,826,099 A | * | 5/1989 | Johnson | A01M 31/06 242/375 |
| 4,827,653 A | | 5/1989 | Sewell | |
| 5,367,813 A | | 11/1994 | Cherry | |
| D394,895 S | | 6/1998 | Moody | |
| 5,941,008 A | * | 8/1999 | Schmidt | A01M 31/06 43/2 |
| 6,412,210 B1 | | 7/2002 | Horrell | |
| 6,760,993 B2 | * | 7/2004 | Lebens | A01M 31/06 242/379 |
| 7,475,509 B2 | * | 1/2009 | Cagle | A01M 31/06 43/3 |
| 8,584,395 B2 | | 11/2013 | Tonkovich | |
| 2003/0204983 A1 | | 11/2003 | Porter | |
| 2005/0022440 A1 | | 2/2005 | Pinkston | |
| 2008/0155879 A1 | | 7/2008 | Whipple et al. | |
| 2016/0324143 A1 | | 11/2016 | Beauchamp | |

\* cited by examiner

*Primary Examiner* — David J Parsley

(57) ABSTRACT

A decoy tethering device for deploying and retrieving a decoy assembly includes a housing. A line is selectively extensible from and retractable into the housing. A fastener is selectively couplable to the line. A coupler that is coupled to the housing is configured to couple to a keel of a decoy. A connector that is coupled to a second end of the line is configured to couple to a weight. The fastener is positioned to decouple from the line to both extend and retract the line from the housing, and to couple to the line to retain the line in an extended configuration. The coupler is configured to couple the housing to the keel of the decoy. The connector is configured to couple to the weight to position the weight to retain the decoy in place on a surface of a body of water in which the weight is positioned.

7 Claims, 4 Drawing Sheets

DECOY TETHERING DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to tethering devices and more particularly pertains to a new tethering device for deploying and retrieving a decoy assembly.

BRIEF SUMMARY OF THE INVENTION

An embodiment of the disclosure meets the needs presented above by generally comprising a housing. A line is selectively extensible from and retractable into the housing. A fastener is selectively couplable to the line. A coupler that is coupled to the housing is configured to couple to a keel of a decoy. A connector that is coupled to a second end of the line is configured to couple to a weight. The fastener is positioned to decouple from the line to both extend and retract the line from the housing, and to couple to the line to retain the line in an extended configuration. The coupler is configured to couple the housing to the keel of the decoy. The connector is configured to couple to the weight to position the weight to retain the decoy in place on a surface of a body of water in which the weight is positioned.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
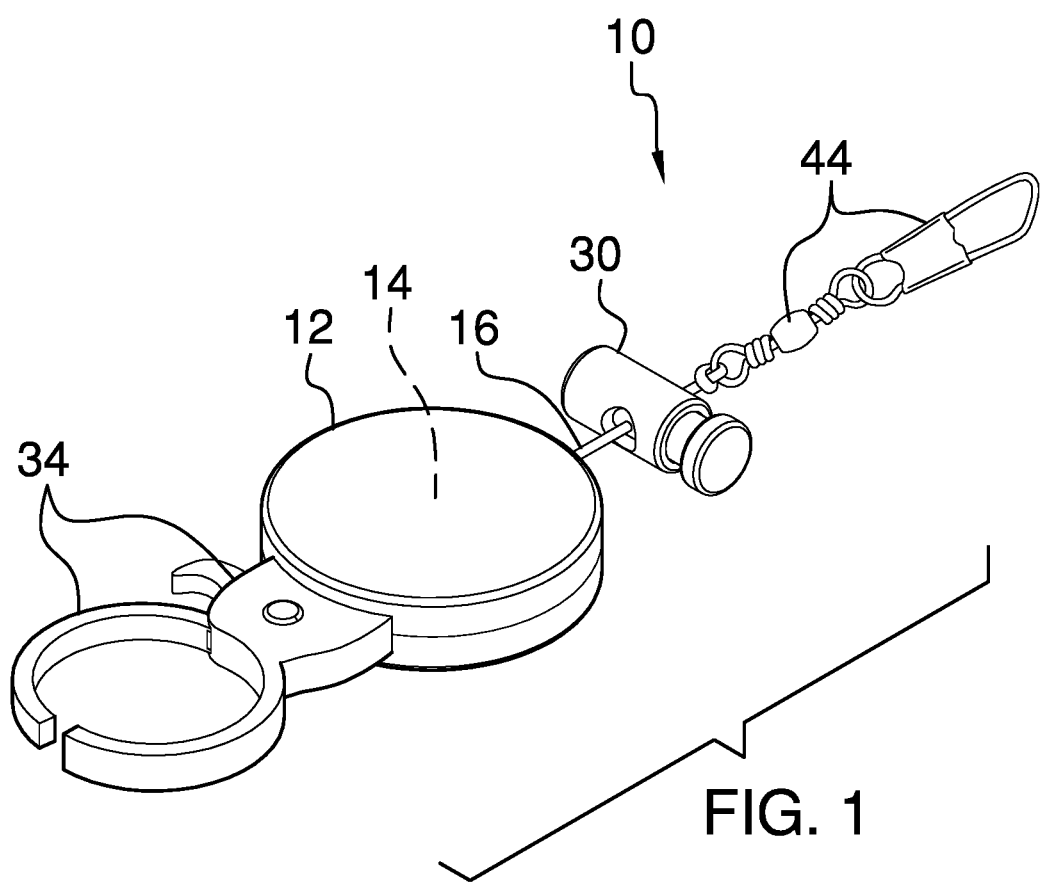
FIG. 1 is an isometric perspective view of a decoy tethering device according to an embodiment of the disclosure.
Figure 2:
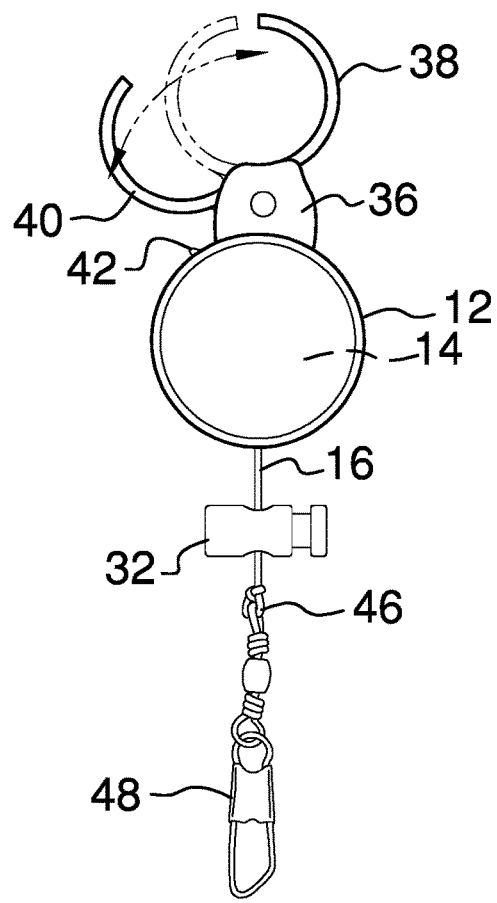
FIG. 2 is a front view of an embodiment of the disclosure.
Figure 3:
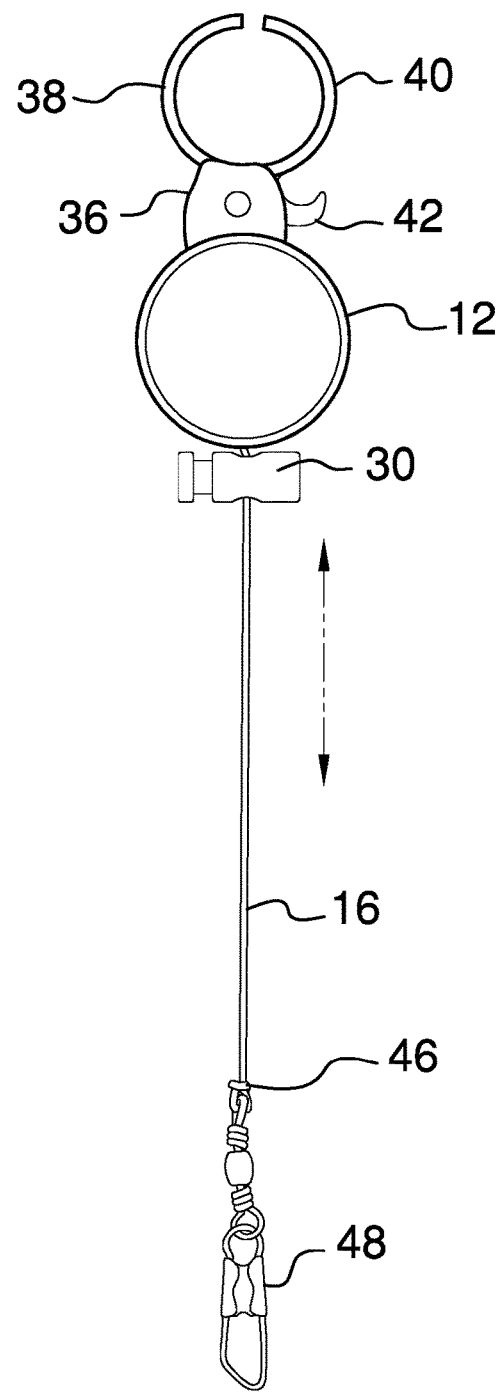
FIG. 3 is a back view of an embodiment of the disclosure.
Figure 4:
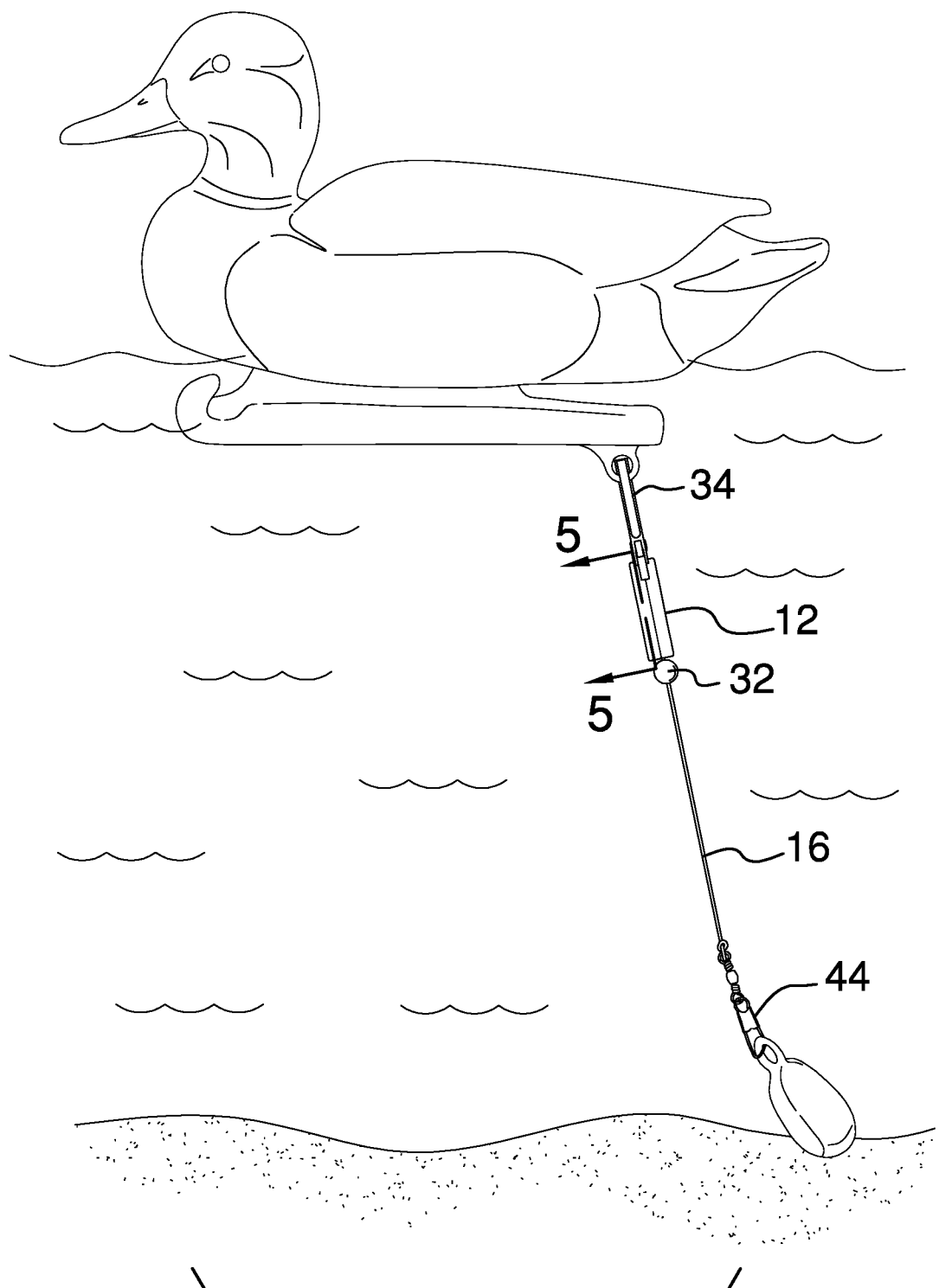
FIG. 4 is an in-use view of an embodiment of the disclosure.
Figure 5:
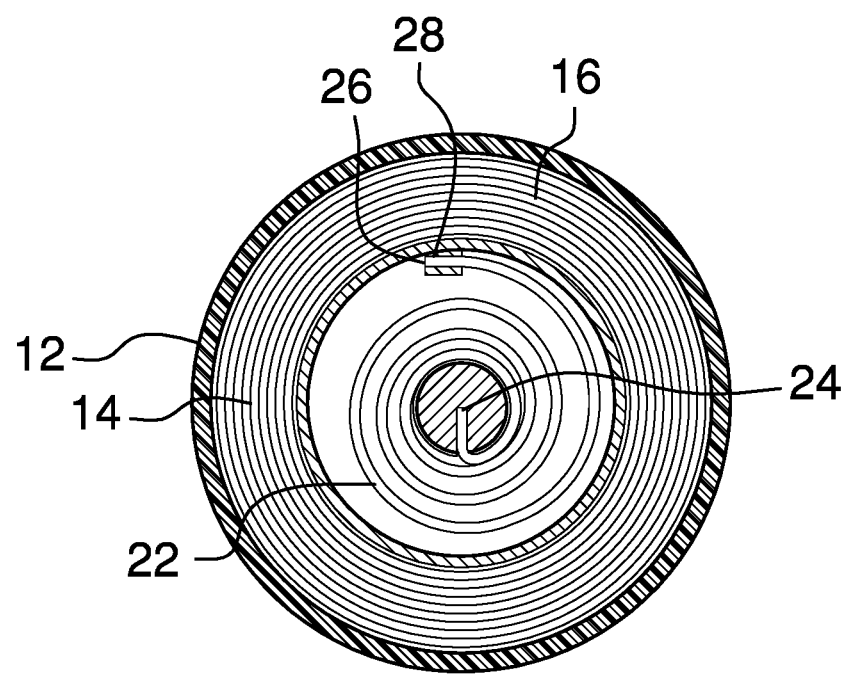
FIG. 5 is a cross-sectional view of an embodiment of the disclosure.

With reference now to the drawings, and in particular to FIGS. 1 through 5 thereof, a new tethering device embodying the principles and concepts of an embodiment of the disclosure and generally designated by the reference numeral 10 will be described.

As best illustrated in FIGS. 1 through 5, the decoy tethering device 10 generally comprises a housing 12 that defines an interior space 14. In one embodiment, the housing 12 is disc shaped. A line 16 is selectively extensible from and retractable into the housing 12. In another embodiment, the line 16 extends through a hole 18 that is positioned in a sidewall 20 of the housing 12.

A spring 22 is positioned in the interior space 14. The spring 22 is coiled. The spring 22 has a first terminus 24 that is coupled to the housing 12. The spring 22 has a second terminus 26 that is coupled to a first end 28 of the line 16. The spring 22 is configured to be tensioned as the line 16 is extended from the housing 12 to position the spring 22 to selectively rebound to retract the line 16 into the housing 12.

A fastener 30 is selectively couplable to the line 16. The fastener 30 is positioned to decouple from the line 16 to both extend and retract the line 16 from the housing 12. The fastener 30 also is positioned to couple to the line 16 to retain the line 16 in an extended configuration. In one embodiment, the fastener 30 comprises a cord lock 32. In another embodiment, the cord lock 32 is barrel-type.

A coupler 34 is coupled to the housing 12. The coupler 34 is configured to couple to a keel of a decoy to couple the housing 12 to the keel of the decoy. In one embodiment, the coupler 34 comprises an extension 36 that is coupled to and extends from the sidewall 20 of the housing 12. In another embodiment, the extension 36 is opposingly positioned to the hole 18.

A first arm 38 is coupled to and extends from the extension 36 distal from the housing 12. The first arm 38 is arcuate. A second arm 40 is pivotally coupled to and extends from the extension 36 distal from the housing 12. The second arm 40 is complementary to the first arm 38. The second arm 40 is positioned to selectively pivot to an open configuration so that the coupler 34 is configured to insert a ring that is coupled to the keel. The second arm 40 also is positioned to selectively pivot to a closed configuration wherein the first arm 38 and the second arm 40 are loopedly positioned through the ring to couple the housing 12 to the decoy.

A lock 42 is coupled to the extension 36. The lock 42 is operationally coupled to the second arm 40. The lock 42 is positioned to retain the second arm 40 in the closed configuration so that the first arm 38 and the second arm 40 are loopedly positioned through the ring to couple the housing 12 to the decoy.

A connector 44 is coupled to a second end 46 of the line 16. The connector 44 is configured to couple to a weight to position the weight to retain the decoy in place on a surface of a body of water in which the weight is positioned. In one embodiment, the connector 44 comprises a fishing swivel 48. The fishing swivel 48 is configured to couple to a loop that is coupled to the weight. The weight is positioned to retain the decoy in place on the surface of the body of water in which the weight is positioned.

In use, the cord lock 32 is positioned to decouple from the line 16 to extend the line 16 from the housing 12. The spring 22 is configured to be tensioned as the line 16 is extended from the housing 12. The cord lock 32 is positioned to couple to the line 16 to retain the line 16 in the extended configuration. The second arm 40 is positioned to pivot to the open configuration so that the coupler 34 is configured to insert the ring that is coupled to the keel. The second arm 40 also is positioned to pivot to the closed configuration so that the first arm 38 and the second arm 40 are loopedly positioned through the ring to couple the housing 12 to the decoy. The lock 42 is positioned to retain the second arm 40 in the closed configuration. The fishing swivel 48 is configured to couple to the loop that is coupled to the weight. The weight is positioned to retain the decoy in place on the surface of the body of water in which the weight is positioned. The cord lock 32 also is positioned to decouple from the line 16 so that the spring 22 is compelled to rebound to retract the line 16 into the housing 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A decoy tethering device comprising:
    a housing defining an interior space, said housing being disc shaped;
    a line selectively extensible from and retractable into said housing, said line extending through a hole positioned in a sidewall of said housing;
    a fastener selectively couplable to said line;
    a coupler coupled to said housing, said coupler being configured for coupling to a keel of a decoy, said coupler comprising
        an extension coupled to and extending from said sidewall of said housing,
        a first arm coupled to and extending from said extension distal from said housing, said first arm being arcuate,
        a second arm pivotally coupled to and extending from said extension distal from said housing, said second arm being complementary to said first arm,
        a lock coupled to said extension, said lock being operationally coupled to said second arm, and
        wherein said second arm is positioned for selectively pivoting to an open configuration such that said coupler is configured for inserting a ring coupled to the keel, and a closed configuration, wherein said first arm and said second arm are loopedly positioned through the ring for coupling said housing to the decoy, wherein said lock is positioned on said extension such that said lock is positioned for retaining said second arm in the closed configuration wherein said first arm and said second arm are loopedly positioned through the ring for coupling said housing to the decoy;
    a connector coupled to a second end of said line, said connector being configured for coupling to a weight; and
    wherein said fastener is positioned on said line such that said fastener is positioned for decoupling from said line for extending and retracting said line from said housing and for coupling to said line for retaining said line in an extended configuration, wherein said coupler is positioned on said housing such that said coupler is configured for coupling said housing to the keel of the decoy, wherein said connector is positioned on said line such that said connector is configured for coupling to the weight positioning the weight for retaining the decoy in place on a surface of a body of water in which the weight is positioned.

2. The device of claim 1, further including a spring positioned in said interior space such that said spring is configured for tensioning as said line is extended from said housing positioning said spring for selectively rebounding for retracting said line into said housing.

3. The device of claim 1, further including said fastener comprising a cord lock.

4. The device of claim 3, further including said cord lock being barrel-type.

5. The device of claim 1, further including said extension being opposingly positioned to said hole.

6. The device of claim 1, further including said connector comprising a fishing swivel, wherein said fishing swivel is positioned on said line such that said fishing swivel is configured for coupling to a loop coupled to the weight positioning the weight for retaining the decoy in place on the surface of the body of water in which the weight is positioned.

7. A decoy tethering device comprising:
    a housing defining an interior space, said housing being disc shaped;
    a line selectively extensible from and retractable into said housing, said line extending through a hole positioned in a sidewall of said housing;
    a spring positioned in said interior space such that said spring is configured for tensioning as said line is extended from said housing positioning said spring for selectively rebounding for retracting said line into said housing;

a fastener selectively couplable to said line, wherein said fastener is positioned on said line such that said fastener is positioned for decoupling from said line for extending and retracting said line from said housing and for coupling to said line for retaining said line in an extended configuration, said fastener comprising a cord lock, said cord lock being barrel-type;

a coupler coupled to said housing, said coupler being configured for coupling to a keel of a decoy, wherein said coupler is positioned on said housing such that said coupler is configured for coupling said housing to the keel of the decoy, said coupler comprising:
  an extension coupled to and extending from said sidewall of said housing, said extension being opposingly positioned to said hole,
  a first arm coupled to and extending from said extension distal from said housing, said first arm being arcuate,
  a second arm pivotally coupled to and extending from said extension distal from said housing, said second arm being complementary to said first arm such that said second arm is positioned for selectively pivoting to an open configuration, wherein said coupler is configured for inserting a ring coupled to the keel, and a closed configuration, wherein said first arm and said second arm are loopedly positioned through the ring for coupling said housing to the decoy, and
  a lock coupled to said extension, said lock being operationally coupled to said second arm, wherein said lock is positioned on said extension such that said lock is positioned for retaining said second arm in the closed configuration wherein said first arm and said second arm are loopedly positioned through the ring for coupling said housing to the decoy;

a connector coupled to a second end of said line, said connector being configured for coupling to a weight, wherein said connector is positioned on said line such that said connector is configured for coupling to the weight positioning the weight for retaining the decoy in place on a surface of a body of water in which the weight is positioned, said connector comprising a fishing swivel, wherein said fishing swivel is positioned on said line such that said fishing swivel is configured for coupling to a loop coupled to the weight positioning the weight for retaining the decoy in place on the surface of the body of water in which the weight is positioned; and wherein said cord lock is positioned on said line such that said cord lock is positioned for decoupling from said line for extending said line from said housing, wherein said spring is positioned on said line such that said spring is configured for tensioning as said line is extended from said housing, wherein said cord lock is positioned for coupling to said line for retaining said line in the extended configuration, wherein said second arm is positioned for selectively pivoting to the open configuration such that said coupler is configured for inserting the ring coupled to the keel, and the closed configuration, wherein said first arm and said second arm are loopedly positioned through the ring for coupling said housing to the decoy, wherein said lock is positioned on said extension such that said lock is positioned for retaining said second arm in the closed configuration, wherein said fishing swivel is positioned on said line such that said fishing swivel is configured for coupling to the loop coupled to the weight positioning the weight for retaining the decoy in place on the surface of the body of water in which the weight is positioned, wherein said cord lock is positioned on said line such that said cord lock is positioned for decoupling from said line such that said spring is compelled for rebounding for retracting said line into said housing.

* * * * *